(12) United States Patent
Miller

(10) Patent No.: US 8,425,867 B2
(45) Date of Patent: Apr. 23, 2013

(54) OXALATE SORBENTS FOR MERCURY REMOVAL

(75) Inventor: Seth Adrian Miller, Englewood, CO (US)

(73) Assignee: Empire Technology Development LLC, Wilmington, DE (US)

( * ) Notice: Subject to any disclaimer, the term of this patent is extended or adjusted under 35 U.S.C. 154(b) by 0 days.

(21) Appl. No.: 13/501,036

(22) PCT Filed: Aug. 15, 2011

(86) PCT No.: PCT/US2011/047786
§ 371 (c)(1),
(2), (4) Date: Apr. 9, 2012

(65) Prior Publication Data
US 2013/0045149 A1    Feb. 21, 2013

(51) Int. Cl.
*B01D 53/64* (2006.01)
*B01J 20/00* (2006.01)
*B01J 20/20* (2006.01)
*B01J 20/30* (2006.01)

(52) U.S. Cl.
USPC .......... 423/210; 502/416; 502/439; 502/514; 502/516

(58) Field of Classification Search .................. 423/210; 502/416, 439, 514, 516
See application file for complete search history.

(56) References Cited

U.S. PATENT DOCUMENTS

| | | | | |
|---|---|---|---|---|
| 3,317,628 | A * | 5/1967 | Schuck et al. | ................. 585/510 |
| 7,670,985 | B2 * | 3/2010 | Ding et al. | ................... 502/180 |
| 7,776,780 | B1 | 8/2010 | Granite et al. | |
| 2005/0101482 | A1 | 5/2005 | Aoyagi et al. | |
| 2006/0229200 | A1 | 10/2006 | Yao et al. | |
| 2007/0167309 | A1 | 7/2007 | Olson | |
| 2007/0295347 | A1 | 12/2007 | Paine et al. | |

FOREIGN PATENT DOCUMENTS

| | | |
|---|---|---|
| DE | 199 50 980 | 1/2001 |
| GB | 2 187 725 | 9/1987 |
| JP | 51-055790 | 5/1976 |
| JP | 53-128577 | 11/1978 |
| JP | 63-305937 | 12/1988 |
| SU | 1766495 | 10/1992 |
| WO | WO-94/11685 | 5/1994 |
| WO | WO-98/31460 | 7/1998 |
| WO | WO-2008/129551 | 10/2008 |
| WO | WO-2009/035525 | 3/2009 |
| WO | WO-2009/127887 | 10/2009 |

OTHER PUBLICATIONS

Alptekin, G., "A New Non-carbon Sorbent for Hg Removal from Flue Gases," Powder Technology, Jan. 2008, 180 (1-2), (12 pages).
Cao, Y. et al., "Study of Mercury Oxidation by a Selective Catalytic Reduction Catalyst in a Pilot-Scale Slipstream Reactor at a Utility Boiler Burning Bituminous Coal," Energy & Fuels, 2007, vol. 21, pp. 145-156.
Cartledge, G.H., et al., "The Catalysis of Eder's Reaction by Cobalt Compounds," J. Am. Chem. Soc., 1933, vol. 55, No. 8, pp. 3214-3221.
Granite, E. J.; et al., "Novel Sorbents for Mercury Removal from Flue Gas," Ind. Eng. Chem. Res., 2000, 39, pp. 1020-1029.
Huggins, F.E., et al., "XAFS Examination of Mercury Sorption on Three Activated Carbons," Energy Fuels, 1999, vol. 13, No. 1, pp. 114-121.
International Search Report and Written Opinion received for PCT/US2011/047786 mailed Nov. 9, 2011.
Kimura, M., et al., "Reduction of Mercuric Chloride to Mercurous Chloride Induced by the Oxidation of Oxalic Acid," J. Phys. Chem., 1973, vol. 77, No. 10, pp. 1262-1265.
Kornfeld, L. et al, "A Study of the Fundamental Factors that Affect Seam Strength," Sci. Ind. Phot. 23,377 (1952) (186 pages).
Miller, S., et al., DOE report, Advanced Hybrid Particulate Collector, A New Concept for Air Toxics and Fine-Particle Control, U.S. Department of Energy (DOE) Program Research and Development Announcement (PRDA), Website: http://www.netl.doe.gov/technologies/coalpower/cctc/resources/pdfsmisc/haps/ps3b-2.pdf, Accessed: Jan. 12, 2012, 24 pages.
Olson, E., et al., "Mechanisms of Mercury Capture and Breakthrough on Activated Carbon Sorbents," Energy and Environmental Research Center, University of North Dakota, American Chemical Society, 220th National Meeting, Aug. 20-24, 2000, pp. 886-889.
Padak, B., et al., "Mercury Binding on Activated Carbon," Dept. of Chemical Engineering, Worcester Polytechnic Institute, Webpage: http://www.nt.ntnu.no/users/skoge/prost/proceedings/aiche-0102006/data/papers/P66657.pdf, Accessed: Jan. 12, 2012, 15 pages.
Padak, B., et al., "Understanding Mercury Binding on Activated Carbon," Carbon, vol. 47, No. 12, Oct. 2009, pp. 2855-2864.
Sakuraba, S., et al., "Studies on the Mechanism of Eder's Reaction. I. Inducing Photochemical Reaction of Manganese (II)—Oxalate System," Bulletin of the Chemical Society of Japan, vol. 30, No. 6, 1957, pp. 662-667, 748.
Senior, C.L., et al., "Emissions of mercury, trade elements, and fine particles from stationary combustion sources," Fuel Processing Technology, vol. 6501366, 2000, pp. 263013288.

* cited by examiner

*Primary Examiner* — Timothy Vanoy
(74) *Attorney, Agent, or Firm* — Foley & Lardner LLP

(57) ABSTRACT

Disclosed are oxalate sorbent compositions, methods for their manufacture, and methods for removing mercury species from waste streams employing oxalate sorbent compositions.

23 Claims, No Drawings

OXALATE SORBENTS FOR MERCURY REMOVAL

CROSS-REFERENCE TO RELATED APPLICATIONS

This application is a U.S. national stage application claiming the benefit of International Application No. PCT/US2011/047786, filed on Aug. 15, 2011. The application is incorporated herein by reference in its entirety.

FIELD

The present technology relates to oxalate sorbent compositions, methods for their manufacture, and methods for using oxalate sorbent compositions to remove mercury from waste streams.

BACKGROUND

Combustion emissions from coal-fired plants and waste incinerators are major contributors of mercury emissions to the environment. The reduction of mercury emissions is of paramount concern, because mercury is one of the most toxic metals that can be released from combustion processes. Mercury is further designated as a hazardous pollutant under the Clean Air Act of 1990. Mercury may be released in numerous forms including elemental mercury (Hg(0)), oxidized mercury (e.g., Hg(I) and Hg(II) as halides and oxides), and particulate mercury, depending on the type of material combusted and the combustion conditions. Of the many techniques employed to reduce mercury emissions, sorption of mercury with activated carbon sorbents may be used. Such sorbents are injected directly into a combustion exhaust gas stream where they sorb mercury pollutants. The mercury-contaminated sorbents are collected in downstream particulate control devices such as bag filters or electrostatic precipitators. To increase sorption efficiency, sorbents may be chemically modified with sulfur, chlorine, or iodine to create sites with enhanced mercury binding. While such chemical modifications have succeeded in increasing mercury sorption capacity by up to 300 times, the manufacture of such sorbents is often impractically expensive, further requiring extended heat treatments and conditioning with hazardous chemicals.

SUMMARY

The present technology provides sorbent compositions which may be used to reduce mercury emissions from waste streams generated by various industrial facilities. The sorbent compositions are prepared in a straightforward fashion from inexpensive materials. In comparison to conventional sorbents, the present sorbent compositions display an improved ability to sorb mercury. Furthermore, the sorbent compositions are fully compatible with existing mercury abatement infrastructure.

In accordance with one aspect, the present technology provides a sorbent composition including at least one carbon sorbent, at least one oxalate, and at least one transition metal cation. In some embodiments, the carbon sorbent includes activated carbon. In some embodiments, the transition metal cation includes one or more of Fe(III), Mn(VII), or Co(III). In some embodiments, the oxalate and transition metal cation are a transition metal oxalate. In some embodiments, the amount of oxalate is from about 0.1 wt % to about 10 wt % of the total weight of the sorbent composition.

In accordance with another aspect, the present technology provides a method of manufacturing a sorbent composition, the method including: contacting at least one carbon sorbent, at least one oxalate, and at least one transition metal cation to provide the sorbent composition. In some embodiments, the transition metal cation includes one or more of Fe(III), Mn(VII), or Co(III). In some embodiments, the oxalate and transition metal cation are a transition metal oxalate. In some embodiments, the contacting is performed in an absence of a liquid. In other embodiments, the contacting is performed in the presence of a liquid. In some such embodiments, the liquid is an aqueous solution. In some such embodiments, the method further includes separating the sorbent composition from the liquid. In some embodiments, the method further includes drying the sorbent composition.

The present technology may also be used to reduce or remove mercury from waste streams. Thus, in accordance with another aspect, the present technology includes contacting a gas including Hg(II) compounds with a sorbent composition, where the sorbent composition includes at least one carbon sorbent, at least one oxalate, and at least one transition metal cation. In some embodiments, the gas includes flue gas. In some such embodiments, the flue gas is from a coal-fired plant or from a waste incinerator. In some embodiments, the carbon sorbent includes activated carbon. In some embodiments, the transition metal cation includes one or more of Fe(III), Mn(VII), or Co(III). In some embodiments, the oxalate and transition metal cation are a transition metal oxalate. In certain embodiments, the amount of oxalate in the sorbent composition is from about 0.1 wt % to about 10 wt % of the total weight of the sorbent composition. In some embodiments, the contacting is performed at about 50° C. to about 350° C. In some embodiments, the sorbent composition is injected into the gas at the rate of about 0.5 lb/MMacf to about 200 lb/MMacf. In other embodiments, the method further includes capturing the sorbent composition from the gas by electrostatic precipitation, bag filtration or both.

The foregoing summary is illustrative only and is not intended to be in any way limiting. In addition to the illustrative aspects, embodiments and features described above, further aspects, embodiments and features will become apparent by reference to the following drawings and the detailed description.

DETAILED DESCRIPTION

The illustrative embodiments described in the detailed description and claims are not meant to be limiting. Other embodiments may be utilized, and other changes may be made, without departing from the spirit or scope of the subject matter presented here.

The technology is described herein using several definitions, as set forth throughout the specification.

The use of the terms "a" and "an" and "the" and similar referents in the context of describing the elements (especially in the context of the following claims) are to be construed to cover both the singular and the plural, unless otherwise indicated herein or clearly contradicted by context.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

In general, "substituted" refers to a group, as defined below (e.g., an alkyl or aryl group) in which one or more bonds to a hydrogen atom contained therein are replaced by a bond to non-hydrogen or non-carbon atoms. Substituted groups also include groups in which one or more bonds to a carbon(s) or hydrogen(s) atom are replaced by one or more bonds, including double or triple bonds, to a heteroatom. Thus, a substituted group will be substituted with one or more substituents, unless otherwise specified. In some embodiments, a substituted group is substituted with 1, 2, 3, 4, 5, or 6 substituents. Examples of substituent groups include: halogens (i.e., F, Cl, Br, and I); hydroxyls; alkoxy, alkenoxy, alkynoxy, aryloxy, aralkyloxy, heterocyclyloxy, and heterocyclylalkoxy groups; carbonyls(oxo); carboxyls; esters; urethanes; oximes; hydroxylamines; alkoxyamines; aralkoxyamines; thiols; sulfides; sulfoxides; sulfones; sulfonyls; sulfonamides; amines; N-oxides; hydrazines; hydrazides; hydrazones; azides; amides; ureas; amidines; guanidines; enamines; imides; isocyanates; isothiocyanates; cyanates; thiocyanates; imines; nitro groups; nitriles (i.e., CN); and the like.

Alkyl groups include straight chain and branched alkyl groups having from 1 to 20 carbon atoms or, in some embodiments, from 1 to 12, 1 to 8, 1 to 6, or 1 to 4 carbon atoms. Alkyl groups further include cycloalkyl groups. Examples of straight chain alkyl groups include those with from 1 to 8 carbon atoms such as methyl, ethyl, n-propyl, n-butyl, n-pentyl, n-hexyl, n-heptyl, and n-octyl groups. Examples of branched alkyl groups include, but are not limited to, isopropyl, iso-butyl, sec-butyl, tert-butyl, neopentyl, isopentyl, and 2,2-dimethylpropyl groups. Representative substituted alkyl groups may be substituted one or more times with substituents such as those listed above. For example, the term haloalkyl refers to an alkyl group substituted with one or more halogen atoms.

Aryl groups are cyclic aromatic hydrocarbons that do not contain heteroatoms. Aryl groups include monocyclic, bicyclic and polycyclic ring systems. Thus, aryl groups include, but are not limited to, phenyl, azulenyl, heptalenyl, biphenylenyl, indacenyl, fluorenyl, phenanthrenyl, triphenylenyl, pyrenyl, naphthacenyl, chrysenyl, biphenyl, anthracenyl, indenyl, indanyl, pentalenyl, and naphthyl groups. In some embodiments, aryl groups contain 6-14 carbons, and in others from 6 to 12 or even 6-10 carbon atoms in the ring portions of the groups. Although the phrase "aryl groups" includes groups containing fused rings, such as fused aromatic-aliphatic ring systems (e.g., indanyl, tetrahydronaphthyl, and the like), it does not include aryl groups that have other groups, such as alkyl or halo groups, bonded to one of the ring members. Rather, groups such as tolyl are referred to as substituted aryl groups. Representative substituted aryl groups may be mono-substituted or substituted more than once. For example, monosubstituted aryl groups include, but are not limited to, 2-, 3-, 4-, 5-, or 6-substituted phenyl or naphthyl groups, which may be substituted with substituents such as those listed above.

Aralkyl groups are alkyl groups as defined above in which a hydrogen or carbon bond of an alkyl group is replaced with a bond to an aryl group as defined above. In some embodiments, aralkyl groups contain 7 to 20 carbon atoms, 7 to 14 carbon atoms or 7 to 10 carbon atoms. Substituted aralkyl groups may be substituted at the alkyl, the aryl or both the alkyl and aryl portions of the group. Representative aralkyl groups include but are not limited to benzyl and phenethyl groups and fused (cycloalkylaryl)alkyl groups such as 4-ethyl-indanyl. Representative substituted aralkyl groups may be substituted one or more times with substituents such as those listed above.

Unless context dictates otherwise, as used herein, the term "mercury" includes any type of mercury such as elemental mercury, Hg(0), as well as mercury compounds where mercury is in an oxidized form, such as found in Hg(I) and/or Hg(II) compounds. Examples of mercury compounds include, but are not limited to, mercury(I) chloride, mercury (II) chloride, mercury(I) bromide, mercury(II) bromide, mercury(I) iodide, mercury(II) iodide, mercury(I) sulfate, mercury(II) sulfate, mercury(I) nitrate, mercury (II) acetate, mercury(II) benzoate, mercury(II) iodate, mercury(II) cyanide, mercury(II) oxide (including both red mercury(II) oxide and yellow mercury(II) oxide), mercury(II) sulfide, diphenylmercury(II), phenylmercuric acetate, phenylmercuric hydroxide, dimethylmercury(II), methymercuric bromide, methylmercuric chloride, and the like.

As used herein, the term "sorbent" means a material capable of taking up another substance through sorption processes, such as absorption and/or adsorption processes. The term includes an adsorbent and an absorbent. A sorbent may condense, bind, capture, or otherwise hold atoms, molecules, or ions of another substance either on its surface or within its inner structure such as within its pores, crevices, or channels. The term "carbon sorbent" means a carbon-containing sorbent, and includes activated carbon and activated charcoal, as further defined below.

The term "sorption" refers to absorption and/or adsorption. Sorption is intended to encompass interactions on the outer surface of the sorbent, as well as interactions within the pores or channels of the sorbent. The term "sorb" means to absorb and/or adsorb.

One of the more promising techniques for improving mercury capture from coal-fired plants and waste incineration facilities is to use carbon sorbents to sorb mercury species. Most commonly, mercury is removed from combustion exhaust gases by direct injection of a carbon sorbent into the exhaust gas stream, resulting in the sorption of mercury by the carbon sorbent. The mercury-contaminated carbon sorbent is captured downstream using various particle capture systems. While such mercury abatement techniques are fully compatible with existing plant infrastructure (which typically have particle capture systems already in place for collecting fly ash), the efficiency of conventional carbon sorbents in sequestering mercury from combustion gases is lower than desired.

Experimental results and theoretical calculations show that Hg(I) species such as mercury(I) chloride (i.e., $Hg_2Cl_2$, sometimes referred to as HgCl or "calomel") are effectively sorbed by carbon sorbents, while mercury species with other oxidation numbers, such as Hg(II) and Hg(0), spontaneously desorb from carbon sorbents. Huggins, F. E. et al. *Energy Fuels* 1999, 13(1), 114-121 and Padak, B. et al. *Carbon* 2009, 47, 2855-2864. In the context of mercury abatement techniques employing carbon sorbents, these results indicate that improved mercury capture may be achieved by reducing transiently sorbed Hg(II) species to Hg(I), while not over-reducing Hg(II) to Hg(0).

Oxidized forms of mercury may be reduced with reducing agents. The reduction of mercury(II) chloride to mercury(I) chloride is shown in Equation 1 below, and is commonly referred to as the "Eder's reaction."

$$2HgCl_2 + C_2O_4^{2-} \rightarrow Hg_2Cl_2 + 2CO_2 + 2Cl^- \qquad (1)$$

In the Eder's reaction, Hg(II) is reduced with oxalate anion to form Hg(I), and carbon dioxide is formed. In the original reports of the Eder's reaction, the reduction reaction was observed to be catalyzed by light. Subsequent reports indicated that the redox reaction is also catalyzed by metal ions. Cartledge, G. H. et al. *Journal of the American Chemical Society* 1933, 55(8), 3214-3221. Furthermore, the metal-catalyzed reaction was shown to be very efficient at elevated temperatures, affording Hg(I) exclusively from Hg(II) within minutes at 75° C. Kimura, M. et al. *Journal of Physical Chemistry* 1973, 77(10), 1262-1265.

The sorbent compositions of the present technology include a reducing environment for Hg(II), such that Hg(II) is selectively and efficiently reduced to Hg(I) within (or on) the carbon sorbent. Due to the greater affinity of carbon sorbents for Hg(I), the present sorbent compositions sorb increased amounts of mercury in comparison to conventional carbon sorbents which do not include such a reducing environment. Accordingly, the present sorbent compositions display an improved ability over conventional carbon sorbents to remove mercury from waste streams.

According to one aspect, the present technology provides a sorbent composition including at least one carbon sorbent, at least one oxalate, and at least one transition metal cation. Carbon sorbents include a variety of carbon-containing materials, such as activated carbon, activated charcoal, and the like. The term "activated carbon" (and "activated charcoal") generally refers to a black, solid carbonaceous material that remains after pyrolytic decomposition of various organic materials (including but not limited to, fossil fuels, coal, peat, lignite, charcoal, bones, sugar, coconuts, nutshells, wood, coir, etc.) which has undergone an activating process during or after the pyrolysis. Pyrolytic decomposition of the organic material typically is performed at a temperature from about 600° C. to about 900° C., often under an inert atmosphere with gases such as nitrogen or argon. Activated carbon is a porous material characterized by a high carbon content and a large surface area, and is typically a mixture of amorphous carbon and graphite crystals, rather than a well-defined material. Activation is performed by a variety of methods, such as by exposing the decomposed organic material to a chemical agent such as steam, carbon dioxide, metal chloride (e.g., zinc chloride), phosphoric acid, potassium hydroxide, sodium hydroxide, or potassium sulfide, at high temperatures. Temperatures sufficient for activation generally range from about 250° C. to about 1200° C. Activated carbon may have a microporous, mesoporous, and/or macroporous pore structure. Activated carbon is available from numerous commercial sources in variety of physical forms (e.g., powders, granules, spherical beads, fibers, clothes, extruded and monolith materials, etc.) and specifications (e.g., surface areas, pore sizes, iodine numbers, molasses numbers, methylene blue adsorptive capacities, dechlorination capacities, hardnesses and abrasion numbers, apparent densities, ash contents, particle size distributions, etc.). The present technology contemplates the use of any type of carbon sorbents, including activated carbon.

The carbon sorbent may be in the form of a powder, such as powdered activated carbon or the form of granules, such as granular activated carbon. The carbon sorbent may have an average particle size of about 1 µm, about 2 µm, about 3 µm, about 4 µm, about 5 µm, about 6 µm, about 7 µm, about 8 µm, about 9 µm, about 10 µm, about 11 µm, about 12 µm, about 13 µm, about 14 µm, about 15 µm, about 16 µm, about 17 µm, about 18 µm, about 19 µm, about 20 µm, about 25 µm, about 30 µm, about 35 µm, about 40 µm, about 45 µm, about 50 µm, about 55 µm, about 60 µm, about 65 µm, about 70 µm, about 75 µm, about 80 µm, about 85 µm, about 90 µm, about 95 µm, about 100 µm, or greater than 100 µm, or may fall in a range between and including any two of these values. In some embodiments, the carbon sorbent is activated carbon. In some embodiments, the carbon sorbent is a powder. In some embodiments, the carbon sorbent has an average particle size from about 1 µm to about 20 µm. In other embodiments, the carbon sorbent has an average particle size from about 6 µm to about 15 µm. In some embodiments the carbon sorbent has an average particle size greater than 100 µm.

The present sorbent compositions also include at least one oxalate. The term "oxalate" refers to any ionic or molecular substance which includes an oxalate group, —O—C(O)C(O)—O—, or a precursor thereof, as is commonly understood in the art. Examples of oxalates include, but are not limited to: oxalic acid, $C_1$-$C_{20}$ alkyl oxalate esters (e.g., dimethyl oxalate, diethyl oxalate, monoethyl oxalate, dibutyl oxalate, di-tert-butyl oxalate, and the like), $C_6$-$C_{14}$ aryl oxalate esters (e.g., diphenyl oxalate, bis(pentafluorophenyl oxalate, bis(2,4-dinitrophenyl) oxalate, bis(2,4,6-trichlorophenyl) oxalate, and the like), $C_7$-$C_{20}$ aralkyl oxalate esters (e.g., dibenzyl oxalate, phenethyl oxalate, and the like), ammonium or quaternary ammonium oxalates (e.g., diammonium oxalate, bis(triethylammonium) oxalate, and the like); alkali metal oxalates (e.g., monosodium oxalate, disodium oxalate, monopotassium oxalate, dipotassium oxalate, potassium sodium oxalate, dicesium oxalate); alkaline earth metal oxalates (e.g., magnesium oxalate, calcium oxalate, zinc oxalate, and the like); transition metal oxalates as further defined below (e.g., cerium(IV) oxalate, manganese(VII) oxalate, cobalt(III) oxalate, cesium(III) oxalate, dysprosium(III) oxalate, erbium(III) oxalate, europium(III) oxalate, gadolinium(III) oxalate, iron(II) oxalate, iron(III) oxalate, lanthanum(III) oxalate, lutetium(III) oxalate, neodymium(III) oxalate, nickel(II) oxalate, samarium(III) oxalate, scandium(III) oxalate, and the like), or mixed oxalate species of any of the foregoing, including for example, oxalates such as potassium chromium(III) oxalate, potassium titanium oxide oxalate, ammonium iron(III) oxalate, potassium iron(III) oxalate, ammonium niobate(V) oxalate, ammonium titanyl oxalate, sodium methyl oxalate, potassium cobalt(III) oxalate (i.e., potassium trioxalatocobaltate(III)), and the like. The present technology further contemplates the use of the above oxalates in anhydrous forms or solvate forms, including but not limited to hydrates (e.g., potassium cobalt(III) oxalate trihydrate). Examples of oxalate group precursors include, but are not limited to oxalyl halides (e.g., oxalyl chloride and the like) and other activated oxalyl compounds (e.g., di(1-benzotriazolyl) oxalate, N,N'-disuccinimidyl oxalate, and the like). The present sorbent compositions may include more than one oxalate. In some embodiments, the oxalate is a transition metal oxalate, e.g., iron(III) oxalate, manganese(VII) oxalate, or potassium cobalt(III) oxalate.

The sorbent composition of the present technology includes at least one transition metal cation. The term "transition metal" means an element having an atomic number ranging from 21-30, 39-48, 57-80, and 89-103, inclusive. This range includes the lanthanide and actinide series of elements, 57-71 and 89-103, respectively. As used herein, the term "transition metal cation" means either a positively charged ion of a transition metal or a complex of a transition metal where the transition metal possesses a positive oxidation number. The term "oxidation number" refers to the charge that a transition metal of a transitional metal complex would bear, if all the ligands bonded to the transition metal were removed along with the electron pairs that were shared by the ligands with the transition metal. The transition metal may have an oxidation number of I, II, III, IV, V, VI, VII, or VIII. Thus, as will be understood by those of skill in the art, the transition metal cation will typically be in the form of a transition metal salt or transition metal complex. Thus, term "transition metal cation" also includes transition metal cations which are in the form of complex anions (e.g., [Co(oxalato)$_3$]$^{3-}$, where the cobalt has an oxidation number of III and is bonded to three dianionic oxalate ligands). The present sorbent compositions may include more than one transition metal cation. Where more than one transition metal cation is present in the sorbent composition, the oxidation numbers of the transition metal cations may be the same or different. In some embodiments, the transition metal cation is a cation of iron, manganese, or cobalt. In some embodiments, the oxidation number of the transition metal is III or VII. In some embodiments, the transition metal cation is one or more of Fe(III), Mn(VII), or Co(III).

The transition metal cation may or may not be bonded to the oxalate, such as bonded through a covalent or ionic bond. Where the transition metal cation is bonded to the oxalate, such as substance is referred to herein as a "transitional metal oxalate." Examples of transition metal oxalates include, but are not limited to, those indicated above. The present sorbent compositions may include more than one transition metal cation and more than one oxalate, which may or may not be bound to any or all of the transition metal cations as to be a transition metal oxalate. For example, the sorbent composition may include iron(III) oxalate and iron(III) chloride and oxalic acid. As a further example, the sorbent composition may include tris(ethylenediamine)cobalt(III) nitrate, iron(III) chloride, and ammonium oxalate. In some embodiments, the oxalate and the transition metal cation are a transition metal oxalate. In some such embodiments, the oxalate and the transition metal cation are iron(III) oxalate, manganese(VII) oxalate, or potassium cobalt(III) oxalate.

As previously described, a transition metal cation can catalyze the reduction of Hg(II) to Hg(I) with an oxalate. Accordingly, the transition metal cation may, but need not be, present in a catalytic amount. For example, while a sorbent composition of the present technology which includes iron(III) oxalate will be effective to reduce Hg(II) to Hg(I), a different sorbent composition of the present technology which includes an oxalate such as ammonium oxalate and a catalytic amount of a iron(III) cation such as iron(III) chloride may also be effective to reduce Hg(II) to Hg(I). Stated another way, the amount the transition metal cation, may, but need not, depend on the amount of the oxalate in the sorbent composition.

The weight percent of oxalate in the total weight of the sorbent composition can and will vary. The amount of the oxalate in the total weight of the sorbent composition may be about 0.01 wt %, about 0.05%, about 0.1 wt %, about 0.5 wt %, about 1 wt %, about 2 wt %, about 3 wt %, about 4 wt %, about 5 wt %, about 6 wt %, about 7 wt %, about 8 wt %, about 9 wt %, about 10 wt %, or a range between and including any two of these values. In some embodiments, the amount of the oxalate in the total weight of the sorbent composition is from about 0.1 wt % to about 10 wt % or is from about 0.5 wt % to about 2 wt %.

The oxalate and the transition metal cation may be present on or in any portion of the sorbent composition. For example, the oxalate and the transition metal cation may be present on a surface of the sorbent composition and/or in an interior portion of the sorbent composition, such as in pores or channels. The oxalate and the transition metal cation may each be present in different portions of the sorbent composition. In some embodiments, at least one of the oxalate and the transition metal cation is present on the surface of the sorbent. In other embodiments at least one of the oxalate and the transition metal cation is present in the interior of the sorbent composition. In some embodiments, the oxalate and the transition metal cation are present only on the surface of the sorbent composition. In other embodiments, the oxalate and the transition metal cation are present only in the interior of the sorbent composition. In some embodiments, the oxalate and the transition metal cation are present both on the surface and in the interior of the sorbent composition.

The present technology provides methods of manufacturing any of the aforementioned sorbent compositions. In one aspect, the method includes contacting a carbon sorbent, an oxalate, and a transition metal cation to provide a sorbent composition. The carbon sorbent, the oxalate, and the transition metal cation may be any of those previously described. In some embodiments, the contacting of the carbon sorbent, the oxalate, and the transition metal cation is performed in a solid phase, such as through ball milling or mechanical mixing. In this regard, the components are contacted in the absence of a liquid or solvent. In some such embodiments, the transition metal cation and the oxalate are ball-milled to a particle size of about 200 nm and mechanically mixed with the carbon sorbent. The oxalate and the transition metal cation may adhere to the surface of the carbon sorbent.

In other embodiments, the carbon sorbent, the oxalate, and the transition metal are contacted in a liquid. As used herein, the term "liquid" refers to any substance which is a liquid at standard pressure and temperature (STP), as will be appreciated by those of skill in the art. Suitable liquids include, but are not limited to, water, an organic solvent, or a mixture thereof. Examples of suitable classes of organic solvents include, but are not limited to, alcohols, ethers, glycol ethers, ketones, amides, nitriles, hydrocarbons, halogenated hydrocarbons, or mixtures of any two or more thereof. Specific examples of organic solvents include methanol, ethanol, n-propanol, isopropanol, n-butanol, tert-butanol, diethyl ether, diisopropyl ether, dibutyl ether, tetrahydrofuran, 2-methyltetrahydrofuran, monoglyme, diglyme, acetone, 2-butanone, N,N-dimethylformamide, N,N-dimethylacetamide, N-methylpyrrolidinone, acetonitrile, hexane, isooctane, toluene, xylenes, dichloromethane, chloroform, and the like. Where the liquid is a mixture of water and an organic liquid, the mixture may be homogeneous or heterogeneous. The water, the organic solvent, or mixture thereof may optionally include additional solutes, including but not limited to, the transition metal cation, the oxalate, and/or the transition metal oxalate. In some embodiments, the liquid is an aqueous solution. In some embodiments, the liquid includes an oxalate and/or a transition metal cation. In some embodiments, the transition metal cation is one or more of Fe(III), Mn(VII), or Co(III). In some embodiments, the liquid includes a transition metal oxalate.

The carbon sorbent, the oxalate, and the transition metal cation may be contacted in a liquid using a number of different methods. The transition metal cation and the oxalate, together in the form of a transition metal oxalate, may be dissolved in a liquid (such as in water to form an aqueous solution), and the carbon sorbent added. The transition metal oxalate will sorb in and/or on the carbon sorbent to provide the sorbent composition. Such a method is described in Example 1. The transition metal cation and the oxalate may be separately added to a liquid which includes the carbon sorbent. Where a given transition metal oxalate displays limited solubility, alternative methods of contacting may be adopted. For example, the carbon sorbent may be contacted with a first liquid which includes either the oxalate or the transition metal cation, such that either the oxalate or the transition metal cation are sorbed by the carbon sorbent. The carbon sorbent which includes either the oxalate or the transition metal cation may then be contacted with a second liquid that includes either the transition metal cation or the oxalate, respectively, such that the carbon sorbent sorbs the transition metal cation or the oxalate as to form the sorbent composition. In this regard, the transition metal cation and the oxalate may react by a precipitation reaction to form the transition metal oxalate on, and/or within, the sorbent composition.

In some embodiments, the method of manufacture further includes separating the sorbent composition from the liquid. In this regard, after the contacting of the carbon sorbent, the oxalate, and the transition metal cation in the liquid, the sorbent composition thus formed will typically be in the form of a heterogeneous mixture, i.e., sorbent composition (typically insoluble) in the presence of the liquid. The sorbent composition may be separated from the liquid using any number of techniques commonly known in the art such as by centrifuging, decanting, filtering, evaporating, and the like. A combination of two or more such techniques may used. For example, the sorbent composition may be filtered, followed by drying with heat, under reduced pressure, or with both. Where the sorbent composition is separated from the liquid by evaporating the liquid from the heterogeneous mixture, the heterogeneous mixture may be heated at a temperature and at a pressure sufficient to cause evaporation the liquid. The heterogeneous mixture may be heated at a temperature up to and including the boiling point of the liquid, or may be heated at about room temperature, about 30° C., about 40° C., about 50° C., about 60° C., about 70° C., about 80° C., about 90° C., about 100° C., or at a temperature higher than 100° C. The heterogeneous mixture may further be heated under reduced pressure to evaporate the liquid and thus provide the sorbent composition. In this regard, the heterogeneous mixture may be heated at a pressure of about 760 mmHg, about 700 mmHg, about 600 mmHg, about 500 mmHg, about 400 mmHg, about 300 mmHg, about 200 mmHg, about 100 mmHg, about 50 mmHg, about 25 mmHg, about 10 mmHg, or at a pressure less than 10 mmHg, or at a pressure between and including any two of these values.

In some embodiments, the method of manufacture further includes drying the sorbent composition. The sorbent composition may be heated at a temperature, at a pressure, and for at time period sufficient to dry the sorbent composition. The sorbent composition may be dried at a temperature up to and including the boiling point of the liquid, if a liquid was used in the contacting step, or may be dried at about room temperature, about 30° C., about 40° C., about 50° C., about 60° C., about 70° C., about 80° C., about 90° C., about 100° C., or at a temperature higher than 100° C. The sorbent composition may be dried at a pressure of about 760 mmHg, about 700 mmHg, about 600 mmHg, about 500 mmHg, about 400 mmHg, about 300 mmHg, about 200 mmHg, about 100 mmHg, about 50 mmHg, about 25 mmHg, about 10 mmHg, or at a pressure less than 10 mmHg, or at a pressure between and including any two of these values. The sorbent composition may be dried for a time period of about 1 hour, about 4 hours, about 8 hours, about 16 hours, about 1 day, about 2 days, about 3 days, or longer than 3 days, or a range of times between and including any two of these values.

The sorbent compositions of the present technology can be used to reduce or remove metals from gaseous and liquid waste streams. Such metals include the mercury in all its various forms, including Hg(0), Hg(I), and/or Hg(II). In one aspect, the present technology provides a method, the method including contacting a gas including Hg(II) compounds with a sorbent composition, wherein the sorbent composition includes a carbon sorbent, an oxalate, and a transition metal cation. In this regard, the sorbent composition reduces Hg(II) to Hg(I), thereby allowing for enhanced sorption of mercury from the gas.

The sorbent compositions of the present technology may be used to sorb mercury from any gas which contains mercury. Gases which contain mercury are commonly produced by waste incinerators, coal-fired plants, and other industries which combust organic materials such as through fossil fuel combustion, fossil fuel reforming, and fossil fuel gasification. In some embodiments, the gas is a flue gas. As used herein, the term "flue gas" refers to the exhaust gas from any sort of combustion process, including, but not limited to the combustion of coal, oil, natural gas, etc. In addition to containing mercury species, flue gas typically includes gases such as $SO_2$, $SO_3$, HCl, $NO_x$ (e.g., NO, $NO_2$), water, etc.

In conventional mercury abatement systems, mercury is removed from flue and other gases using activated carbon. In one representative process, powdered activated carbon is directly injected into a flue gas stream where it sorbs gaseous mercury species. The mercury-contaminated activated carbon is then collected in a downstream particulate control device such as a bag filter (i.e., fabric filter), electrostatic precipitator (ESP), a wet or a dry scrubber, or hybrid system. In bag filtration, fabric filter bags are used to separate and collect powdered activated carbon. The fabric filter bags provide a surface on which the powdered activated carbon (and other particulates such as fly ash) collect through a variety of mechanisms, including inertial collection, interception, Brownian movement, and electrostatic forces. Fabric filter bags may be employed in a variety of types of baghouses, including mechanical-shaker baghouses, reverse-air baghouses, and reverse-jet baghouses. Mercury-contaminated activated carbon may also be collected by an electrostatic precipitator. An electrostatic precipitator uses electrostatic forces to separate contaminated activated carbon and other dust particles from flue and other gases. In the case of electrostatic precipitators, particulate-contaminated flue gases flow through a plurality of discharging and collecting electrodes, where the particulates become charged as they pass through an ionized field. The charged particles are then attracted to a grounded or positively charged electrode. The collected particulate material on the electrode is removed by rapping or vibrating the collecting electrodes. Finally, in another representative process, mercury may be removed from flue gases using a fixed-bed reactor which includes a bed of granulated activated carbon. Unlike direct injection of a powdered activated carbon into a gas stream, the physical location of the granular activated carbon is fixed in such a mercury abatement system.

Any of present sorbent compositions described herein may be used in the aforementioned mercury abatement systems, or in any other mercury abatement system which employs conventional carbon sorbents to sorb mercury. Use of the present sorbent compositions in direct injection applications is particularly advantageous to reduce mercury emissions. In particular, residence time of carbon sorbents injected into a mercury-containing gas stream is relatively short (gas-solid contact times of seconds) in comparison to the residence times of carbon sorbents in a fixed-bed reactor (contact times of minutes or hours), thus requiring that the carbon sorbent efficiently remove mercury from the gas stream. The reducing properties, and thus the enhanced sorption capabilities, of the present sorbent composition allow for such efficient mercury removal. The sorbent compositions of the present technology may be in contact with the gas for a period of about 1 second, about 5 seconds, about 10 seconds, about 30 seconds, about 1 minute, about 5 minutes, about 10 minutes, about 30 minutes, about 1 hour, about 5 hours, about 10 hours, about 1 day, about 3 days, or longer than 3 days, or a range of times between and including any two of these values.

The present sorbent compositions are exposed to a mercury containing gas in a quantity sufficient to remove mercury from the gas. The quantity of sorbent composition contacted with a given volume of gas can and will vary. Volumes of gases are typically expressed in millions of actual cubic feet, MMacf, where "actual" refers to the actual volume of the gas, as opposed to the volume of the gas at STP. The sorbent composition may be injected into the gas (or otherwise contacted with the gas, such as in a fixed bed reactor) at a rate of about 0.1 lb (pounds)/MMacf, about 0.5 lb/MMacf, about 1 lb/MMacf, about 5 lb/MMacf, about 10 lb/MMacf, about 25 lb/MMacf, about 50 lb/MMacf, about 75 lb/MMacf, about 100 lb/MMacf, about 125 lb/MMacf, about 150 lb/MMacf, about 175 lb/MMacf, about 200 lb/MMacf, about 225 lb/MMacf, about 250 lb/MMacf, about 275 lb/MMacf, or about 300 lb/MMacf, or a range of rates between and including any two of these values. In some embodiments, the sorbent composition is injected into the gas at a rate of about 0.5 lb/MMacf to about 200 lb/MMacf.

The reduction of Hg(II) to Hg(I) by the present sorbent compositions will be kinetically favored at elevated temperatures (e.g., temperatures of about 100° C. or greater), such as those commonly encountered with flue or other combustion exhaust gases. The reduction is also thermodynamically favored since entropy increases considerably through the reduction reaction. Thus, sorption of mercury from gases is favored at higher temperatures. The sorbent compositions of the present technology may be contacted with gases at any temperature which does not result in substantial decomposition of the sorbent compositions. The sorbent compositions may be contacted with the gases at a temperature of about room temperature, about 30° C., about 40° C., about 50° C., about 60° C., about 70° C., about 80° C., about 90° C., about 100° C., about 125° C., about 150° C., about 175° C., about 200° C., about 225° C., about 250° C., about 275° C., about 300° C., about 325° C., about 350° C., about 375° C., about 400° C., or higher than 400° C., or temperatures between and including any two of these values. In some embodiments, contacting of the sorbent compositions is performed at a temperature of about 50° C. to about 350° C. In certain embodiments, contacting of the sorbent compositions with the gas is performed at a temperature of about 150° C. to about 200° C.

After the sorbent compositions have been contacted with the gas including Hg(II) compounds, the sorbent composition may be collected by any of the previously described particulate control devices. In some embodiments, the method further includes capturing the sorbent composition from the gas by electrostatic precipitation, bag filtration, or both.

Mercury in the form of Hg(0) may be present in the gas. Such metallic mercury may be oxidized to Hg(II) with a variety of catalysts known in the art, such as with Ir and Ir/Pt catalysts as described in U.S. Pat. No. 7,776,780. Further, metallic mercury may be oxidized to Hg(II) with a variety of selective catalytic reduction (SCR) catalysts known in the art, in the manner similar to that described by Cao, et al. Energy & Fuels 2007, 21, 145-156. By oxidizing Hg(0) present in the gas to Hg(II), the present sorbent compositions, which selectively and efficiently reduce Hg(II) to a sorbable Hg(I), additional mercury may be removed from the gas. Thus, in some embodiments, the method further includes oxidizing Hg(0) present in the gas.

The gas after contact with the sorbent compositions ("treated gas") can have a lower concentration of mercury than the gas before contact with the sorbent compositions ("untreated gas"). The reduction in concentration of mercury can generally be any reduction. Examples of reduction in concentration can be about 5%, about 10%, about 20%, about 30%, about 40%, about 50%, about 60%, about 70%, about 80%, about 90%, about 95%, about 96%, about 97%, about 98%, about 99%, and ranges between any two of these values. In an idealized situation, the reduction can be 100%, that is, that the treated gas does not contain detectable levels of mercury.

While the above methods for removing or reducing mercury are generally described for gaseous waste streams, it will be appreciated by those of skill in the art that any of the sorbent compositions described herein may be used to remove mercury from other fluids, such as liquids. For example, the sorbent compositions may be used to remove mercury in its various forms, including Hg(II), from water or aqueous solutions.

The present technology, thus generally described, will be understood more readily by reference to the following examples, which is provided by way of illustration and is not intended to be limiting of the present technology.

EXAMPLES

Example 1

Preparation of an Oxalate Sorbent Composition

A saturated aqueous solution of potassium cobalt(III) oxalate trihydrate is prepared by dissolving potassium cobalt (III) oxalate trihydrate in water, until no further potassium cobalt(III) oxalate trihydrate dissolves. To one liter of this solution is added activated charcoal (100 g, DARCO® FGD, powdered activated carbon, ~325 mesh (~44 µm), available from Norit Americas, Inc., Mashall, Tex.). The mixture is stirred at room temperature for 24 hours, then filtered, to provide moist activated charcoal with sorbed potassium cobalt(III) oxalate. The moist material is dried in vacuo to remove remaining water and the level of loading of potassium cobalt(III) oxalate is calculated by weighing the dried oxalate sorbent composition. The level of loading of potassium cobalt (III) oxalate may be varied by adjusting the amounts of potassium cobalt(III) oxalate and/or activated charcoal used in the above procedure.

Example 2

Alternative Preparation of an Oxalate Sorbent Composition

To a rapidly stirring mixture of activated charcoal (100 g, DARCO® FGD, powdered activated carbon, ~325 mesh) in water (200 g) is added potassium cobalt(III) oxalate trihydrate (49.4 g, 100 mmol). After 24 hours, the mixture is filtered to provide moist activated charcoal sorbed with potassium cobalt(III) oxalate. The moist material is collected and dried in vacuo to remove remaining water and the level of loading of potassium cobalt(III) oxalate is calculated by weighing the oxalate sorbent. The level of loading of potassium cobalt(III) oxalate may be varied by adjusting the amounts of potassium cobalt(III) oxalate, and/or activated charcoal used in the above procedure. This procedure may be modified by employing other oxalates (e.g., oxalic acid, sodium oxalate, iron(III) oxalate, etc.).

Example 3

Absorption of Hg(I) from Flue Gas

The oxalate sorbent from Example 1 or 2 is injected into flue gas upstream of an electrostatic precipitator or baghouse filter at about 150-200° C., at a ratio of approximately 1 lb/MMacf. Mercury is monitored using a Tekran® Series 3300 mercury measurement system, and it is found that oxalate sorbent removes an overall larger fraction of mercury than the corresponding sorbent without oxalate.

EQUIVALENTS

The embodiments, illustratively described herein may suitably be practiced in the absence of any element or elements, limitation or limitations, not specifically disclosed herein. Thus, for example, the terms 'comprising,' 'including,' 'containing,' etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase 'consisting essentially of' will be understood to include those elements specifically recited and those additional elements that do not materially affect the basic and novel characteristics of the claimed technology. The phrase 'consisting of' excludes any element not specified.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent compositions, apparatuses, and methods within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as 'up to,' 'at least,' 'greater than,' 'less than,' and the like, include the number recited and refer to ranges which can be subsequently broken down into subranges as discussed above. Finally, as will be understood by one skilled in the art, a range includes each individual member.

While certain embodiments have been illustrated and described, it should be understood that changes and modifications can be made therein in accordance with ordinary skill in the art without departing from the technology in its broader aspects as defined in the following claims.

What is claimed is:

1. A sorbent composition comprising at least one carbon sorbent, at least one oxalate, and at least one transition metal cation, wherein the transition metal cation is a cobalt cation.

2. The sorbent composition of claim 1, wherein the carbon sorbent comprises activated carbon.

3. The sorbent composition of claim 1, wherein the oxalate and transition metal cation are a transition metal oxalate.

4. The sorbent composition of 3, wherein the transition metal oxalate is potassium cobalt(III) oxalate.

5. The sorbent composition of claim 1, wherein the amount of oxalate is from about 0.1 wt % to about 10 wt % of the total weight of the sorbent composition.

6. A method comprising contacting a gas comprising Hg(II) compounds with a sorbent composition, wherein the sorbent composition comprises at least one carbon sorbent, at least one oxalate, and at least one transition metal cation, wherein the transition metal cation is a cobalt cation.

7. The method of claim 6, wherein the carbon sorbent comprises activated carbon.

8. The method of claim 6, wherein the oxalate and transition metal cation are a transition metal oxalate.

9. The method of claim 8, wherein the transition metal oxalate is potassium cobalt(III) oxalate.

10. The method of claim 6, wherein the amount of oxalate in the sorbent composition is from about 0.1 wt % to about 10 wt % of the total weight of the sorbent composition.

11. The method of claim 6, wherein the contacting is performed at about 50° C. to about 350° C.

12. The method of claim 6, wherein the sorbent composition is injected into the gas at the rate of about 0.5 lb/MMacf to about 200 lb/MMacf.

13. The method of claim 6, further comprising capturing the sorbent composition from the gas by electrostatic precipitation, bag filtration or both.

14. The method of claim 6, wherein the gas comprises flue gas.

15. The method of claim 14, wherein the flue gas is from a coal-fired plant or from a waste incinerator.

16. A method of manufacture comprising contacting a carbon sorbent, an oxalate, and a transition metal cation to provide a sorbent composition, wherein the transition metal cation is a cobalt cation.

17. The method of claim 16, wherein the contacting is in a liquid.

18. The method of claim 17, wherein the liquid is an aqueous solution.

19. The method of claim 17, further comprising separating the sorbent composition from the liquid.

20. The method of claim 17, further comprising drying the sorbent composition.

21. The method of claim 16, wherein the contacting is in an absence of a liquid.

22. The method of claim 16, wherein the oxalate and transition metal cation are a transition metal oxalate.

23. The method of claim 22, wherein the transition metal oxalate is potassium cobalt(III) oxalate.

* * * * *

UNITED STATES PATENT AND TRADEMARK OFFICE
CERTIFICATE OF CORRECTION

PATENT NO. : 8,425,867 B2
APPLICATION NO. : 13/501036
DATED : April 23, 2013
INVENTOR(S) : Miller Page 1 of 1

It is certified that error appears in the above-identified patent and that said Letters Patent is hereby corrected as shown below:

In the Specifications:

In Column 4, Line 11, delete "methymercuric" and insert -- methylmercuric --, therefor.

In Column 6, Line 11, delete "bis(pentafluorophenyl" and insert -- bis(pentafluorophenyl) --, therefor.

In Column 8, Line 21, delete "standard pressure and temperature" and insert -- standard temperature and pressure --, therefor.

In Column 9, Line 13, delete "may used." and insert -- may be used. --, therefor.

In Column 12, Line 29, delete "(-44 μm)," and insert -- (~44 μm), --, therefor.

In Column 12, Line 30, delete "Mashall," and insert -- Marshall, --, therefor.

In the Claims:

In Column 14, Line 13, in Claim 4, delete "of 3," and insert -- of claim 3, --, therefor.

Signed and Sealed this
Ninth Day of July, 2013

Teresa Stanek Rea
*Acting Director of the United States Patent and Trademark Office*